United States Patent
Lee et al.

(10) Patent No.: US 11,993,312 B2
(45) Date of Patent: May 28, 2024

(54) REINFORCEMENT STRUCTURE FOR ELECTRIC VEHICLE

(71) Applicants: HYUNDAI MOTOR COMPANY, Seoul (KR); Kia Corporation, Seoul (KR)

(72) Inventors: Byeongcheon Lee, Seoul (KR); Yun A Cho, Suwon-si (KR); Jiwoong Park, Hwaseong-si (KR); Kyeong Jae Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/861,466

(22) Filed: Jul. 11, 2022

(65) Prior Publication Data

US 2023/0017436 A1 Jan. 19, 2023

(30) Foreign Application Priority Data

Jul. 14, 2021 (KR) ........................ 10-2021-0092143

(51) Int. Cl.
*B62D 25/14* (2006.01)
*B62D 25/20* (2006.01)

(52) U.S. Cl.
CPC ......... *B62D 25/14* (2013.01); *B62D 25/2018* (2013.01)

(58) Field of Classification Search
CPC ............ B62D 25/2018; B62D 25/2045; B62D 25/14; B62D 25/08; B62D 25/145
USPC ...... 296/203.02, 203.01, 193.02, 70, 193.07, 296/184.1
See application file for complete search history.

(56) References Cited

U.S. PATENT DOCUMENTS

| | | | | |
|---|---|---|---|---|
| 5,882,065 A | * | 3/1999 | Koiwa ................. | B62D 25/082 296/203.02 |
| 6,102,466 A | * | 8/2000 | Kanazawa ........... | B62D 25/082 296/75 |
| 2015/0137558 A1 | * | 5/2015 | Ayuzawa ............. | B62D 25/025 296/193.07 |
| 2015/0145283 A1 | * | 5/2015 | Nishino ............... | B62D 25/145 296/187.1 |
| 2017/0073012 A1 | * | 3/2017 | Hyuga ................. | B62D 21/152 |
| 2017/0096169 A1 | * | 4/2017 | Takeda ................. | B62D 21/11 |
| 2019/0002032 A1 | * | 1/2019 | Takii .................... | B62D 27/065 |
| 2019/0009829 A1 | * | 1/2019 | Shirakami ............. | B62D 25/14 |
| 2022/0009330 A1 | * | 1/2022 | Woo ........................ | B60K 1/04 |
| 2023/0072159 A1 | * | 3/2023 | Atsumi ................. | B62D 25/14 |

FOREIGN PATENT DOCUMENTS

| | | | | | |
|---|---|---|---|---|---|
| JP | 2020026183 A | * | 2/2020 | ........... | B60R 13/083 |
| KR | 19990020507 A | * | 3/1999 | | |

OTHER PUBLICATIONS

KR-19990020507—A machine translation (Year: 1999).*

* cited by examiner

*Primary Examiner* — Amy R Weisberg
*Assistant Examiner* — Veronica M Shull
(74) *Attorney, Agent, or Firm* — MORGAN, LEWIS & BOCKIUS LLP (57) ABSTRACT

A reinforcement structure for an electric vehicle includes a lower dash portion lower panel, a lower dash portion upper panel forming a closed cross-section with the lower dash portion lower panel in a vehicle body length direction and a dash lower reinforcement provided inside the closed cross-section.

16 Claims, 6 Drawing Sheets

REINFORCEMENT STRUCTURE FOR ELECTRIC VEHICLE

CROSS-REFERENCE TO RELATED APPLICATION

The present application claims priority to Korean Patent Application No. 10-2021-0092143 filed on Jul. 14, 2021, the entire contents of which is incorporated herein for all purposes by this reference.

BACKGROUND OF THE PRESENT DISCLOSURE

Field of the Present Disclosure

The present disclosure relates to a reinforcement structure for an electric vehicle. More particularly, the present disclosure relates to a reinforcement structure for an electric vehicle capable of reinforcing the strength of a vehicle body and transmitting collision energy during a collision.

Description of Related Art

In the existing internal combustion engine vehicle, parts such as power system and exhaust system are provided through the tunnel structure formed in the lower portion of the vehicle body.

The present configuration cannot make the dash panel and center floor flat, but the tunnel structure contributes greatly to improving vehicle body strength. That is, the lower portion of the dash is composed of a panel, and there are members on the upper and lower portions of the floor to reinforce the strength against collision.

Due to worldwide exhaust gas regulation, the power source was changed from fossil fuel to battery, and the battery was mounted on the lower portion of the vehicle body floor, occupying the space where the floor lower member was.

The tunnel structure that the existing power system passed through was changed to a flat floor to expand the internal space, and the tunnel structure that reinforced the vehicle body strength was deleted. It became difficult to secure the protection and vehicle body strength.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a reinforcement structure for an electric vehicle that can reinforce the strength without the tunnel structure of a general internal combustion engine vehicle.

A reinforcement structure for an electric vehicle according to various exemplary embodiments of the present disclosure may include a lower dash portion lower panel, a lower dash portion upper panel forming a closed cross-section with the lower dash portion lower panel in a vehicle body length direction and a dash lower reinforcement provided inside the closed cross-section.

The reinforcement structure may further include a front side member mounted in front of the vehicle, and a center floor member mounted at a lower portion of the vehicle, wherein the dash lower reinforcement may be provided between the front side member and the center floor member.

The dash lower reinforcement may have a closed cross-section shape.

The dash lower reinforcement may further include a reinforcement rib formed on the inside.

The dash lower reinforcement may further include a connection pipe to connect the dash lower reinforcement and a battery mounted on the lower portion of the vehicle.

A connection hole may be formed in the dash lower reinforcement.

The dash lower reinforcement may be positioned inside than the front side member along a width direction of the vehicle.

The center floor member may be positioned inside than the dash lower reinforcement along a width direction of the vehicle.

The center floor member may include a front center floor member mounted on the dash lower reinforcement and a main center floor member mounted on a center floor of the vehicle behind the front center floor member.

The dash lower reinforcement may be positioned lower than the front side member relative to the vehicle height direction and the main center floor member may be positioned relatively lower than the dash lower reinforcement in the height direction of the vehicle.

The reinforcement structure according to various exemplary embodiments of the present disclosure may further include a cross member mounted between the front center floor member and the main center floor member.

The front center floor member may include a front flange connected to the lower dash portion upper panel and a front center floor protrusion protruding from the front flange to form a closed cross-section with the lower dash portion upper panel.

The reinforcement structure according to various exemplary embodiments of the present disclosure may further include a slope reinforcement positioned between the dash lower reinforcement and the front side member.

The dash lower reinforcement may be formed by extrusion molding of aluminum.

The dash lower reinforcement may be formed of a steel material.

According to an exemplary embodiment of the reinforcement structure for an electric vehicle according to an exemplary embodiment of the present disclosure, it is possible to secure the strength while keeping the lower structure flat, and minimization of the use of the strength reinforcement member.

Furthermore, the effects obtainable or predicted by the exemplary embodiments of the present disclosure are to be included directly or implicitly in the detailed description of the exemplary embodiments of the present disclosure. That is, various effects predicted according to various exemplary embodiments of the present disclosure will be included in the detailed description to be described later.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

To clearly explain an exemplary embodiment of the present disclosure, parts irrelevant to the description are omitted, and the same reference numerals are assigned to the same or similar elements throughout the specification.

Because the size and thickness of each component shown in the drawings are arbitrarily indicated for convenience of description, the present disclosure is not necessarily limited to that shown in the drawings, and the thickness is enlarged to clearly express various parts and regions.

Furthermore, in the following detailed description, the reason that the names of components are divided into 1st, 2nd, etc. is to classify them in the same relationship, and it is not necessarily limited to the order in the following description.

Throughout the specification, when a part includes a certain element, it means that other elements may be further included, rather than excluding other elements, unless specifically stated otherwise.

Furthermore, terms such as . . . part, . . . means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

Various exemplary embodiments of the present disclosure will hereinafter be described in detail with reference to the accompanying drawings.

Figure 1:
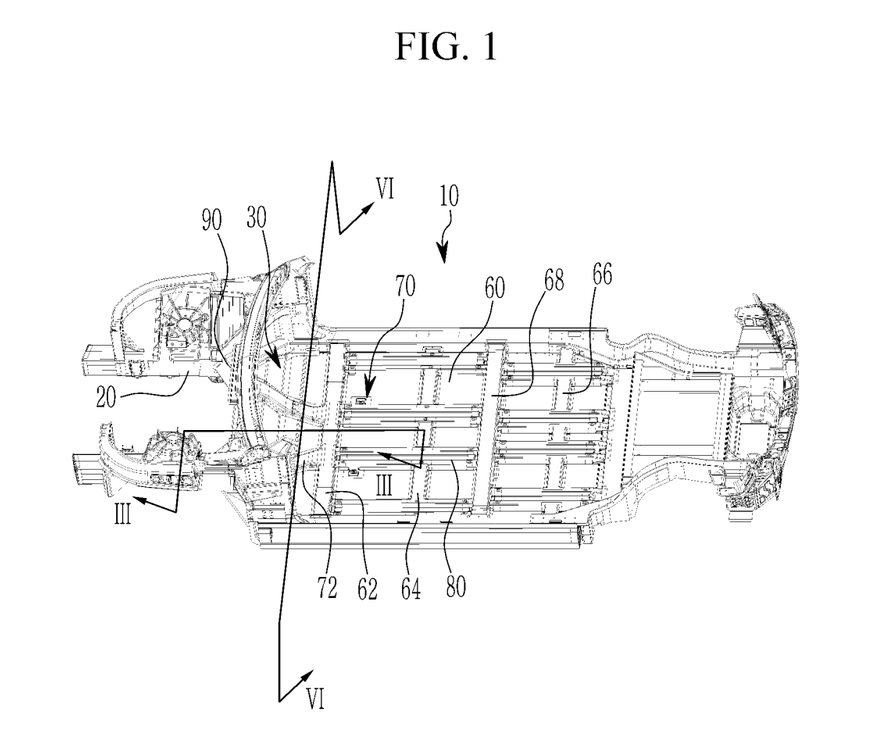
FIG. 1 is a perspective view of a reinforcement structure for an electric vehicle according to various exemplary embodiments of the present disclosure.
Figure 2:
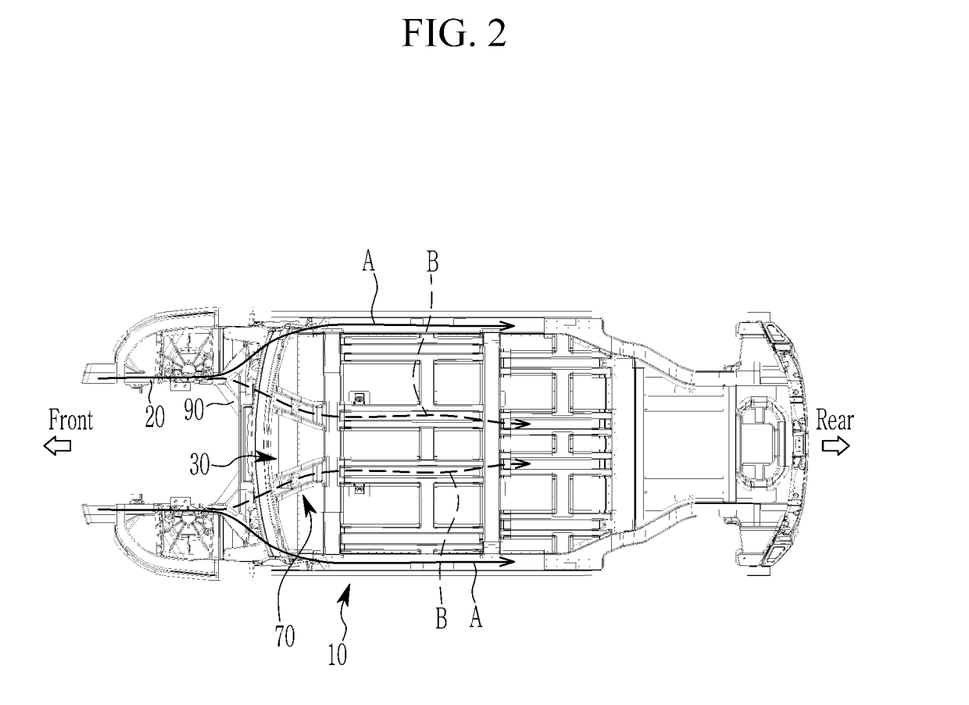
FIG. 2 is a top plan view of a reinforcement structure for an electric vehicle according to various exemplary embodiments of the present disclosure.

FIG. 1 is a perspective view of a reinforcement structure for an electric vehicle according to various exemplary embodiments of the present disclosure and FIG. 2 is a top plan view of a reinforcement structure for an electric vehicle according to various exemplary embodiments of the present disclosure.

Figure 3:
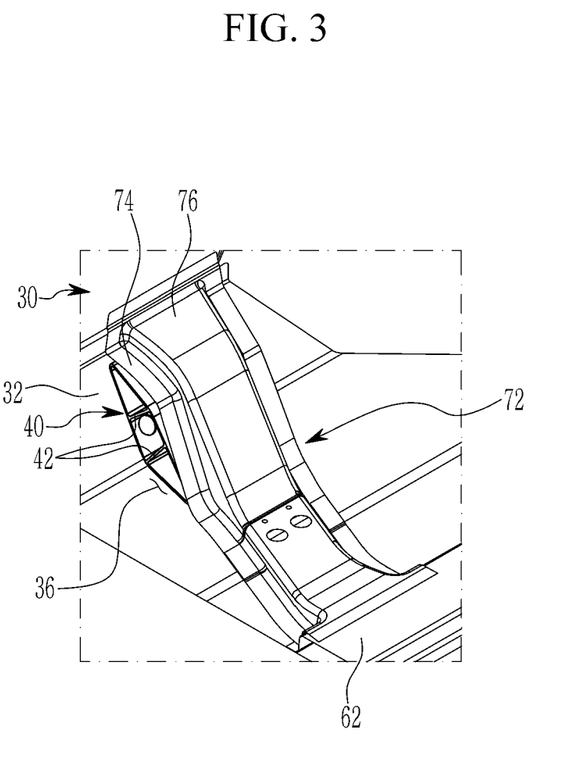
FIG. 3 is a partial cross-section perspective view along line III-III of FIG. 1.
Figure 4:
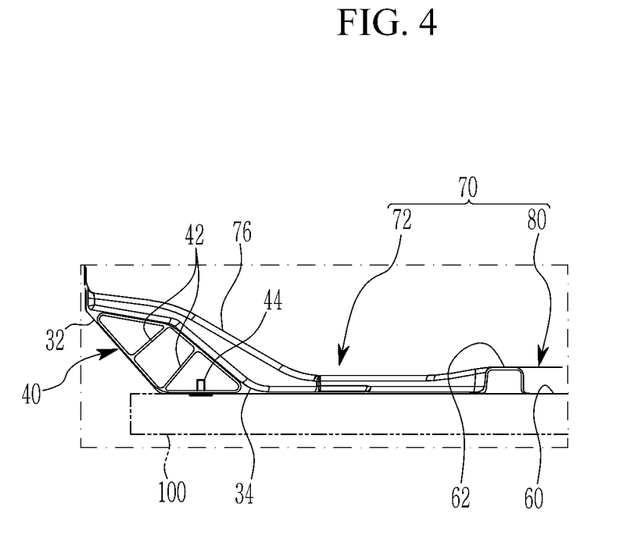
FIG. 4 is a partial cross-sectional view along line IV-IV of FIG. 1.

FIG. 3 is a partial cross-section perspective view along line III-III of FIG. 1 and FIG. 4 is a partial cross-sectional view along line IV-IV of FIG. 1.

Referring to FIG. 1, FIG. 2, FIG. 3, and FIG. 4, a reinforcement structure for an electric vehicle according to various exemplary embodiments of the present disclosure will be described.

A vehicle to which a reinforcement structure according to various exemplary embodiments of the present disclosure may be applied may be an electric vehicle 10.

In a general internal combustion engine vehicle, parts such as a power system and exhaust system are disposed through the tunnel structure formed in the lower portion of the vehicle body. The present configuration cannot make the dash panel and center floor flat, but the tunnel structure contributes greatly to improving vehicle body strength. That is, the lower portion of the dash includes a panel and there are members on the upper and lower portions of the floor to reinforce the strength against collision.

However, a vehicle to which a reinforcement structure according to various exemplary embodiments of the present disclosure may be applied is an electric vehicle 10, and the lower portion of the vehicle is changed to a flat floor for indoor space expansion, and the tunnel structure through which the existing power system passed has been deleted.

The electric vehicle 10 to which a reinforcement structure according to various exemplary embodiments of the present disclosure may be applied may include a front side member 20 mounted in front of the vehicle and a center floor member 70 mounted on the center floor 60.

In an exemplary embodiment of the reinforcement structure for an electric vehicle according to an exemplary embodiment of the present disclosure, at the time of a front collision of the vehicle, the impact load transmitted to the front side member 20 is transmitted to the rear of the vehicle through an external load pass A passing a member on the side of the vehicle body, for example, through the side sill and an internal load pass B passing through the center floor 60.

First, second, third and fourth cross members 62, 64, 66, and 68 may be mounted on the center floor 60 of the electric vehicle 10 in the width direction of the vehicle body, and the center floor member 70 may cross the plurality of cross members 62, 64, 66 and 68 to be provided in the longitudinal direction to the vehicle body. The provided numbers of the cross members 62, 64, 66 and 68 are exemplary, and various numbers of provided are possible according to the length and weight of the vehicle.

A dash portion 30 is provided between the center floor member 70 and the front side member 20, and the center floor member 70 includes a front center floor member 72 provided behind the dash portion 30.

Referring to FIG. 3 and FIG. 4, the reinforcement structure for an electric vehicle according to various exemplary embodiments of the present disclosure may include a lower dash portion lower panel 32 forming the dash portion 30, a lower dash portion upper panel 34 forming a closed cross-section in the vehicle body length direction together with the lower dash portion lower panel 32, and a dash lower reinforcement 40 provided inside the closed cross-section. That is, a closed space 36 is formed between the lower dash portion lower panel 32 and the lower dash portion upper panel 34, and the dash lower reinforcement 40 is provided in the closed space 36.

The dash lower reinforcement 40 may be provided between the front side member 20 and the center floor member 70, and the impact load transmitted from the front side member 20 may be transmitted to the center floor member 70.

Figure 5:
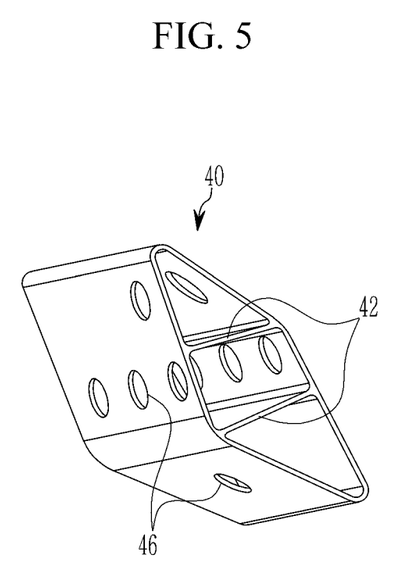
FIG. 5 is a perspective view of the dash lower reinforcement which may be applied to the reinforcement structure for an electric vehicle according to various exemplary embodiments of the present disclosure.

FIG. 5 is a perspective view of the dash lower reinforcement which may be applied to the reinforcement structure for an electric vehicle according to various exemplary embodiments of the present disclosure.

Referring to FIG. 1 to FIG. 5, the dash lower reinforcement 40 may secure the strength of the lower portion of the vehicle while reducing the weight with the closed cross-section.

The dash lower reinforcement 40 may be formed by extrusion molding of aluminum, so it is possible to secure the strength of the lower portion of the vehicle without increasing the weight.

Alternatively, the dash lower reinforcement 40 may be formed of a steel material, which enables impact load transfer and occupant protection.

Furthermore, the dash lower reinforcement 40 may further include a reinforcement rib 42 formed on the inside, and it is possible to secure additional strength through the reinforcement rib 42.

The dash lower reinforcement 40 may further include a connection pipe 44 connecting the dash lower reinforcement 40 and the battery 100 mounted on the lower portion of the vehicle. For example, a connection hole 46 may be formed in the dash lower reinforcement 40, and the connection pipe 44 may be combined with other members of the battery 100 through the connection hole 46, and it is possible to reduce the weight as much as the formed part of the connection hole 46 without serious deterioration of the connection strength.

The dash lower reinforcement 40 may be positioned inside the vehicle than the front side member 20 along the width direction of the vehicle, and the center floor member 70 may be positioned inside the vehicle than the dash lower reinforcement 40 along a width direction of the vehicle.

That is, as shown in FIG. 2, in the event of a front collision of the vehicle, the impact load transmitted to the front side member 20 is transmitted to the rear of the vehicle through the external road pass A formed on the outside of the vehicle and the internal load pass B formed inside the vehicle. In other words, it is easy to distribute the impact load by dualizing the route through which the impact load is transmitted. Furthermore, by forming the internal load path B near the center portion of the vehicle, it is possible to distribute the load over the center floor 60.

An exemplary embodiment of the reinforcement structure for an electric vehicle according to an exemplary embodiment of the present disclosure may further include a slope reinforcement 90 positioned between the dash lower reinforcement 40 and the front side member 20. The slope reinforcement 90 may transmit the impact load delivered to the front side member 20 to the dash lower reinforcement 40.

As shown in FIG. 2 and FIG. 4, the center floor member 70 may include a front center floor member 72 mounted on the dash lower reinforcement 40, and a main center floor member 80 mounted on the center floor 60 behind the front center floor member 72. The cross members 62, 64, 66 and 68, for example the first cross member 62 may be mounted between the front center floor member 72 and the main center floor member 80, and may distribute the impact load transmitted from the front center floor member 72 to the side of the vehicle body. Furthermore, the main center floor member 80 is connected to the first cross member 62 to distribute the impact load in front of the vehicle to the rear of the vehicle body through the center floor 60.

Referring to FIG. 4, the dash lower reinforcement 40 may be positioned lower than the front side member 20 relative to the vehicle height direction, and the main center floor member 70 may be positioned relatively lower than the dash lower reinforcement 40 in the height direction of the vehicle. The height difference makes it possible to secure the space inside the vehicle while smoothly distributing the impact load in the front.

Figure 6:
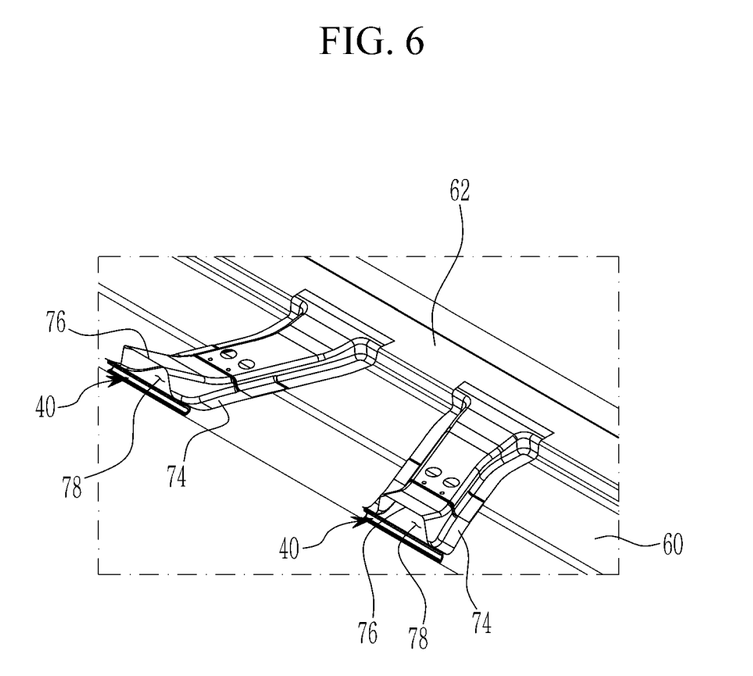
FIG. 6 is a partial cross-section perspective view along line VI-VI of FIG. 1.

FIG. 6 is a partial cross-section perspective view along line VI-VI of FIG. 1.

FIG. 3 and referring to FIG. 6, the front center floor member 70 may include a front flange 74 connected to the lower dash portion upper panel 34, and a front center floor protrusion 76 protruding from the front flange 74 to form a closed cross-section with the lower dash portion upper panel 34.

That is, a closed space 78 is formed inside the front center floor protrusion 76 to suppress the increase in vehicle weight and to smoothly distribute the impact load transmitted from the front direction of the vehicle to the lower portion of the vehicle.

As described above, according to the reinforcement structure for an electric vehicle according to various exemplary embodiments of the present disclosure, it is possible to secure the strength while keeping the lower structure flat, and minimization of the use of the strength reinforcement member.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A reinforcement structure for a vehicle, the reinforcement structure comprising:
   a lower dash portion lower panel;
   a lower dash portion upper panel forming a closed cross-section with the lower dash portion lower panel in a vehicle body length direction;
   a dash lower reinforcement provided inside the closed cross-section;
   a front side member mounted in front of the vehicle; and
   a center floor member mounted at a lower portion of the vehicle,
   wherein the dash lower reinforcement is provided between the front side member and the center floor member, and
   wherein the dash lower reinforcement further includes a connection pipe to connect the dash lower reinforcement and a battery mounted on the lower portion of the vehicle.

2. The reinforcement structure of claim 1, wherein the dash lower reinforcement includes a closed cross-section.

3. The reinforcement structure of claim 2, wherein the dash lower reinforcement further includes a reinforcement rib formed in a closed space of the closed cross-section of the dash lower reinforcement.

4. The reinforcement structure of claim 1, wherein the dash lower reinforcement includes a connection hole through which the connection pipe is mounted.

5. The reinforcement structure of claim 4,
   wherein the dash lower reinforcement further includes a reinforcement rib formed in a closed space of the closed cross-section, and
   wherein a distal end portion of the connection pipe is positioned in the closed space.

6. The reinforcement structure of claim 1, wherein the dash lower reinforcement includes a connection hole.

7. The reinforcement structure of claim 1, wherein the dash lower reinforcement is positioned further inward than the front side member along a width direction of the vehicle.

8. The reinforcement structure of claim 7, wherein the center floor member is positioned further inward than the dash lower reinforcement along the width direction of the vehicle.

9. The reinforcement structure of claim 2, wherein the center floor member includes:
   a front center floor member mounted on the dash lower reinforcement; and
   a main center floor member mounted on a center floor of the vehicle behind the front center floor member.

10. The reinforcement structure of claim 9,
    wherein the dash lower reinforcement is positioned lower than the front side member in a height direction of the vehicle, and
    wherein the main center floor member is positioned relatively lower than the dash lower reinforcement in the height direction of the vehicle.

11. The reinforcement structure of claim 9, further including:
    a cross member mounted between the front center floor member and the main center floor member.

12. The reinforcement structure of claim 9, wherein the front center floor member includes:
    a front flange connected to the lower dash portion upper panel; and
    a front center floor protrusion protruding from the front flange.

13. The reinforcement structure of claim 12, wherein a closed space is formed inside the front center floor protrusion with the lower dash portion upper panel.

14. The reinforcement structure of claim 2, further including a slope reinforcement positioned between the dash lower reinforcement and the front side member.

15. The reinforcement structure of claim 1, wherein the dash lower reinforcement is formed by extrusion molding of aluminum.

16. The reinforcement structure of claim 1, wherein the dash lower reinforcement is formed of a steel material.

* * * * *